United States Patent
Okazaki

(10) Patent No.: US 9,962,770 B2
(45) Date of Patent: May 8, 2018

(54) METHOD FOR PRODUCING CERAMIC HONEYCOMB BODY

(71) Applicant: HITACHI METALS, LTD., Minato-ku, Tokyo (JP)

(72) Inventor: Shunji Okazaki, Fukuoka (JP)

(73) Assignee: HITACHI METALS, LTD., Tokyo (JP)

( * ) Notice: Subject to any disclaimer, the term of this patent is extended or adjusted under 35 U.S.C. 154(b) by 554 days.

(21) Appl. No.: 14/389,924

(22) PCT Filed: Mar. 26, 2013

(86) PCT No.: PCT/JP2013/058752
§ 371 (c)(1),
(2) Date: Oct. 1, 2014

(87) PCT Pub. No.: WO2013/150919
PCT Pub. Date: Oct. 10, 2013

(65) Prior Publication Data
US 2015/0052757 A1 Feb. 26, 2015

(30) Foreign Application Priority Data

Apr. 2, 2012 (JP) ................. 2012-083561

(51) Int. Cl.
*B23Q 1/70* (2006.01)
*B28D 1/16* (2006.01)
(Continued)

(52) U.S. Cl.
CPC ............... *B23B 5/12* (2013.01); *B28B 11/12* (2013.01); *B28D 1/16* (2013.01); *C04B 41/009* (2013.01);
(Continued)

(58) Field of Classification Search
CPC ......... Y10T 29/49995; Y10T 29/49996; Y10T 29/4962; Y10T 82/10; B23B 5/12;
(Continued)

(56) References Cited

U.S. PATENT DOCUMENTS 5,487,694 A * 1/1996 Deming .................... B24B 9/02
409/132
5,749,274 A   5/1998 Chiba
(Continued)

FOREIGN PATENT DOCUMENTS

EP   1685926 A1   8/2006
JP   60-186160 U  12/1985
(Continued)

OTHER PUBLICATIONS

International Search Report of PCT/JP2013/058752, dated Jun. 4, 2013. [PCT/ISA/210].
(Continued)

*Primary Examiner* — Ryan J Walters
*Assistant Examiner* — Lawrence Averick
(74) *Attorney, Agent, or Firm* — Sughrue Mion, PLLC

(57) ABSTRACT

A method for producing a ceramic honeycomb body having large numbers of longitudinal cells partitioned by cell walls, with its peripheral portion removed by machining, includes rotatably holding the ceramic honeycomb body on a main axis of a lathe, and rotating the ceramic honeycomb body around the main axis, to remove its peripheral portion by machining with a tool; the lathe comprising a first fixing jig on the main axis, and a second fixing jig substantially opposing the first fixing jig; each of the first and second fixing jigs having an abutting end portion opposing each other, the abutting end portion having a smaller outer shape than that of the end surface of the ceramic honeycomb body, (Continued)

and the abutting portion having a substantially flat abutting end surface perpendicular to the main axis.

17 Claims, 10 Drawing Sheets

(51) Int. Cl.
  B23B 5/12      (2006.01)
  B28B 11/12     (2006.01)
  C04B 41/85     (2006.01)
  C04B 41/00     (2006.01)
  C04B 41/50     (2006.01)
  C04B 111/00    (2006.01)

(52) U.S. Cl.
  CPC ........ *C04B 41/508* (2013.01); *C04B 41/5089* (2013.01); *C04B 41/85* (2013.01); *B23B 2226/18* (2013.01); *C04B 2111/0081* (2013.01); *C04B 2111/00793* (2013.01); *Y10T 29/4962* (2015.01); *Y10T 82/10* (2015.01)

(58) Field of Classification Search
  CPC ..... B23B 2226/18; B23B 31/40; B23B 33/00; B23B 33/005; B28D 1/16; C04B 41/009; C04B 41/508; C04B 41/5089; C04B 41/85; C04B 2111/00793; C04B 2111/0081; B28B 11/12; B23C 3/122; B23Q 1/70; B23Q 1/703; B23Q 3/06; B23Q 3/002
  USPC ................................... 29/557, 558
  See application file for complete search history.

(56) References Cited

U.S. PATENT DOCUMENTS

| 5,893,793 | A  | * | 4/1999  | Nishio ................ B23B 23/00 451/397 |
| 7,309,277 | B2 |   | 12/2007 | Nishio et al. |
| 7,452,263 | B2 | * | 11/2008 | Itoh .......................... B24B 5/04 451/11 |
| 7,591,918 | B2 |   | 9/2009  | Suwabe et al. |
| 7,727,613 | B2 |   | 6/2010  | Suwabe et al. |
| 7,811,351 | B2 | * | 10/2010 | Oshimi .............. B01D 46/2462 422/177 |
| 8,268,401 | B2 |   | 9/2012  | Tokumaru |
| 8,890,189 | B2 | * | 11/2014 | Hirotsuru ................ C04B 35/52 257/98 |
| 9,089,992 | B2 | * | 7/2015  | Domey ................ B28B 7/0085 |
| 2002/0105139 | A1 | * | 8/2002 | Ficinski ................ A63F 9/0873 273/157 R |
| 2002/0197122 | A1 | * | 12/2002 | Mizutani ............ G05B 19/4015 409/132 |
| 2005/0166729 | A1 |   | 8/2005 | Nishio et al. |
| 2006/0105139 | A1 |   | 5/2006 | Suwabe et al. |
| 2006/0177629 | A1 | * | 8/2006 | Kunieda ............ B01D 39/2086 428/116 |
| 2006/0228519 | A1 |   | 10/2006 | Kato |
| 2007/0082584 | A1 |   | 4/2007 | Itoh |
| 2007/0158879 | A1 |   | 7/2007 | Suwabe et al. |
| 2008/0176029 | A1 |   | 7/2008 | Ichikawa |
| 2008/0268200 | A1 |   | 10/2008 | Domey et al. |
| 2010/0086696 | A1 |   | 4/2010 | Tokumaru |

FOREIGN PATENT DOCUMENTS

| JP | 9-66401 A       | 3/1997  |
| JP | 2004-148791 A   | 5/2004  |
| JP | 2010-525965 A   | 7/2010  |
| WO | 2004/078674 A1  | 9/2004  |
| WO | 2008/004492 A1  | 1/2008  |
| WO | 2008004492 A1   | 1/2008  |
| WO | 2008/117729 A1  | 10/2008 |

OTHER PUBLICATIONS

Communication dated Oct. 14, 2015, issued by the European Patent Office in corresponding European Application No. 13772540.4.

* cited by examiner

METHOD FOR PRODUCING CERAMIC HONEYCOMB BODY

CROSS REFERENCE TO RELATED APPLICATIONS

This application is a National Stage of International Application No. PCT/JP2013/058752 filed Mar. 26, 2013 (claiming priority based on Japanese Patent Application No. 2012-083561, filed Apr. 2, 2012), the contents of which are incorporated herein by reference in their entirety.

FIELD OF THE INVENTION

The present invention relates to a method for producing a ceramic honeycomb body for constituting ceramic honeycomb structures or ceramic honeycomb filters used for removing toxic materials from an exhaust gas discharged from automobile engines, etc.

BACKGROUND OF THE INVENTION

To remove toxic materials from exhaust gases discharged from automobile engines, etc., a ceramic honeycomb structure 1 as shown in FIG. 1 is used for an exhaust-gas-cleaning catalyst converter comprising a ceramic honeycomb structure, and a particulate-matter-capturing filter.

The production of a ceramic honeycomb structure comprises the steps of, for example, mixing and blending ceramic powder such as a cordierite-forming material powder with a binder, a pore-forming material, water, etc. to form a moldable ceramic material; extruding the moldable ceramic material through a extrusion-molding die to form a ceramic honeycomb green body having a honeycomb structure comprising a peripheral wall 11 and flowing paths 4 partitioned by cell walls 3; removing water, etc. from the ceramic honeycomb green body; and sintering it in a furnace. In the sintering step, a molding aid such as a binder, etc. are removed from the green body, providing a ceramic honeycomb structure having predetermined shape and strength and comprising cell walls with fine pores.

When as large a ceramic honeycomb structure as having an outer diameter of 150 mm or more and a length of 150 mm or more, or a ceramic honeycomb structure comprising cell walls as thin as 0.2 mm or less is produced, a green body does not have sufficient strength, suffering such problems as the deformation of cell walls near a peripheral layer by its own weight when extruded, and failure to obtaining predetermined strength after sintering.

To solve such problems, JP 2004-148791 A discloses a method for producing a ceramic honeycomb structure by the extrusion of a moldable ceramic material, drying and sintering, comprising the steps of removing a peripheral portion of a ceramic honeycomb body by machining after drying, and coating the peripheral surface with a peripheral layer after sintering. JP 2004-148791 A describes that the removal of the peripheral portion by machining is conducted by cutting a dried ceramic honeycomb body fixed to a lathe and rotated at 260 rpm with a cemented carbide bite attached to a carrier at a cutting depth of 5 mm and a feed speed of 1.0 mm/second. JP 2004-148791 A describes that the machined ceramic honeycomb body has part of cell walls removed to have grooves open on the peripheral surface, so that cracking does not easily proceed during sintering, and that the peripheral layer is not easily peeled from the honeycomb body, resulting in a honeycomb structure having excellent isostatic strength.

WO2004/078674 A describes a method for producing a ceramic honeycomb structure by the extrusion of a moldable ceramic material, drying and sintering, comprising the steps of drying a green body, alternately plugging one or the other end portion of each cell open on both end surfaces, removing a peripheral portion (peripheral wall and part of cell walls) by machining with a lathe after sintering, and coating the exposed peripheral surface with a peripheral layer. WO2004/078674 A describes that a ceramic honeycomb structure thus obtained is free from breakage when canned, and has excellent heat shock resistance.

Though JP 2004-148791 A and WO 2004/078674 A describe a step of machining a peripheral portion of a ceramic honeycomb body by a lathe in the production of a ceramic honeycomb structure, they fail to describe detailed machining conditions. Generally, when a peripheral portion of a cylindrical body such as a ceramic honeycomb body is machined, one end portion 19 of a ceramic honeycomb body 10 is fixed to a lathe 90 with a chuck 91 as shown in FIG. 12(a), a peripheral portion 12 (hatched portion) is removed, and the end portion 19 not machined because of chucking is then cut off at a position A shown by the dotted line in FIG. 12(b), providing a ceramic honeycomb body of a predetermined length.

However, a ceramic honeycomb body used for cleaning an exhaust gas generally has a cell structure constituted by porous cell walls, with low strength because of high porosity. Accordingly, when its peripheral portion is removed by machining in a chucked state, a chucked portion of the ceramic honeycomb body may be broken by a load during machining. Particularly a high-porosity honeycomb body is more easily broken because of lower strength. Also, when the ceramic honeycomb body is sintered, its strength is reduced because a binder is removed from the green body, breakage occurs more easily. Further, when the ceramic honeycomb body is chucked for machining, a portion not machined because of chucking should be cut off, resulting in a low yield.

OBJECT OF THE INVENTION

Accordingly, an object of the present invention is to provide a method for producing a ceramic honeycomb body with a high yield, suffering little breakage during removing its peripheral portion by machining with a lathe.

DISCLOSURE OF THE INVENTION

As a result of intensive research in view of the above object, the inventors have found that when a peripheral portion of a rotating ceramic honeycomb body is removed by machining, with both end surfaces of the ceramic honeycomb body held under pressure by abutting portions of fixing jigs, whose outer shapes are smaller than those of the end surfaces, the ceramic honeycomb body are unlikely broken, and the peripheral portion is removed from the ceramic honeycomb body by machining at a high yield. The present invention has been completed based on such finding.

Thus, the method of the present invention for producing a ceramic honeycomb body having large numbers of longitudinal cells partitioned by cell walls, with its peripheral portion removed by machining, comprises rotatably holding the ceramic honeycomb body on a main axis of a lathe, and rotating the ceramic honeycomb body around the main axis, to remove a peripheral portion of the ceramic honeycomb body by machining with a tool;

the lathe comprising a first fixing jig on the main axis, and a second fixing jig substantially opposing the first fixing jig;

each of the first and second fixing jigs having an abutting end portion opposing each other, the abutting end portion having a smaller outer shape than that of the end surface of the ceramic honeycomb body, and the abutting portion having a substantially flat abutting end surface perpendicular to the main axis; and the ceramic honeycomb body being held by pressing the abutting surfaces of the first and second fixing jigs to both end surfaces of the ceramic honeycomb body, such that the center axis of the ceramic honeycomb body is substantially in alignment with the main axis of the lathe.

The abutting portions are preferably detachable from the fixing jigs.

The abutting portions are preferably made of a nonmetallic material.

The area ratio of the abutting surface to a cross section of the abutting portion perpendicular to the main axis is preferably 30-100%.

The abutting surface preferably has of surface roughness (maximum height Rz) of 10-500 μm.

The main axis of the lathe is preferably substantially vertical.

The removal by machining is preferably conducted by longitudinally cutting the ceramic honeycomb body rotating at a circumferential speed of 1-10 m/s, with a feeding rate of 0.1-1 mm/rev.

The ceramic honeycomb body may be a sintered body.

A peripheral surface of the ceramic honeycomb body exposed by removing the peripheral portion by machining may be coated with a coating material to form a ceramic honeycomb structure.

The removal of the peripheral portion by machining is preferably conducted by feeding the tool along the rotating ceramic honeycomb body from the first end surface toward the second end surface, to remove the peripheral portion by machining up to a position of 1 mm or more from the second end surface, stopping the feeding of the tool with an unmachined peripheral portion left on the side of the second end surface, and stopping the rotation of the ceramic honeycomb body;

releasing the ceramic honeycomb body from the lathe;

reversing the first and second end surfaces of the ceramic honeycomb body, and rotatably holding the ceramic honeycomb body on the main axis of the lathe, such that its center axis is substantially in alignment with the main axis of the lathe;

rotating the ceramic honeycomb body around the main axis; and feeding the tool along the rotating ceramic honeycomb body from the second end surface toward the first end surface, to remove the unmachined peripheral portion by machining.

The removal of the peripheral portion by machining is preferably conducted by feeding the tool along the rotating ceramic honeycomb body from the first end surface toward the second end surface, to remove the peripheral portion by machining up to a position of 1 mm or more from the second end surface, stopping the feeding of the tool with an unmachined peripheral portion left on the side of the second end surface, and causing the tool to retreat from the ceramic honeycomb body; and feeding the tool along the rotating ceramic honeycomb body from the second end surface toward the first end surface, to remove the unmachined peripheral portion by machining.

Before the peripheral portion is removed from the ceramic honeycomb body by machining with a tool, the first and second end surfaces of the ceramic honeycomb body are preferably chamfered.

DESCRIPTION OF THE PREFERRED EMBODIMENTS

Figure 1A:
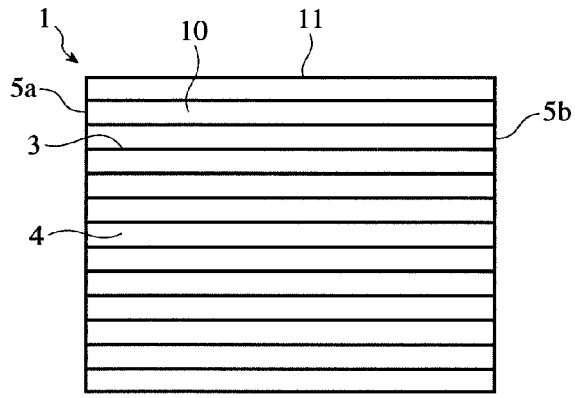
FIG. 1(a) is a longitudinal cross-sectional view schematically showing an example of ceramic honeycomb bodies.
Figure 1B:
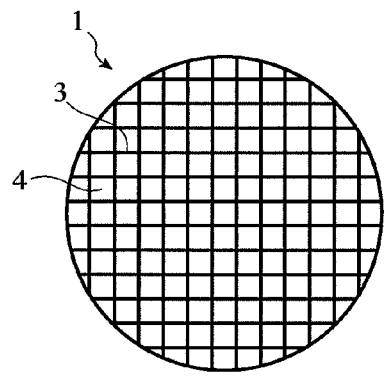
FIG. 1(b) is a transverse cross-sectional view schematically showing an example of ceramic honeycomb bodies.

The embodiments of the present invention will be explained below, without intention of restricting the present invention thereto. Any modifications and improvements of design may be properly made based on common knowledge of those skilled in the art, unless they deviate from the scope of the present invention.

[1] Method for Producing a Ceramic Honeycomb Body

The method of the present invention for producing a ceramic honeycomb body comprises the steps of (a) mixing and blending a ceramic material with a binder, water, and if necessary, a pore-forming material, etc. to prepare a moldable ceramic material; (b) extruding the moldable ceramic material through an extrusion-molding die to form a honeycomb-structured green body comprising a peripheral portion and large numbers of longitudinal cells partitioned by cell walls; (c) drying the green body in a hot-air drying furnace, a microwave-drying furnace, etc. to obtain a dried body; (d) cutting the dried ceramic honeycomb body to a predetermined length, to make both end surfaces substantially flat; (e) removing the peripheral portion by machining from the rotating ceramic honeycomb body held by a lathe; and (f) heating the ceramic honeycomb body with its peripheral portion removed by machining at a predetermined temperature in a sintering furnace, to remove the binder, etc., and to obtain a sintered ceramic honeycomb body. The sintered ceramic honeycomb body may be further cut to a predetermined length to have both substantially flat end surfaces. Though the above method removes the peripheral portion by machining before sintering the ceramic honeycomb body, it may be conducted after sintering.

A peripheral surface of the ceramic honeycomb body with its peripheral portion removed by machining may be coated with a coating material, and one or the other end portions of open cells on both end surfaces may be alternately plugged before or after sintering.

(1) Ceramic Materials

The ceramic material is preferably at least one selected from the group consisting of cordierite, cordierite-forming materials, silicon carbide, composite materials of silicon and silicon carbide, silicon nitride, mullite, alumina, spinel, composite materials of silicon carbide and cordierite, lithium aluminum silicate, and aluminum titanate. Among them, the cordierite-forming materials are preferable. A cordierite-forming material is a ceramic material turned to cordierite by sintering, which has a chemical composition comprising 42-56% by mass of $SiO_2$, 30-45% by mass of $Al_2O_3$, and 12-16% by mass of MgO. Specifically, pluralities of inorganic materials selected from talc, kaolin, calcined kaolin, alumina, aluminum hydroxide and silica are mixed at such ratios as to provide the above chemical composition.

(2) Removal of Peripheral Portion

The removal of a peripheral portion of a ceramic honeycomb body by machining is conducted by rotatably holding a ceramic honeycomb body before or after sintering on a main axis of a lathe, and rotating the ceramic honeycomb body around the main axis to machine a peripheral portion of the rotating ceramic honeycomb body by a tool.

The lathe comprises a first fixing jig on the main axis, and a second fixing jig substantially opposing the first fixing jig, each of the first and second fixing jigs having an abutting end portion opposing each other, the abutting end portion having a smaller outer shape than that of the end surface of the ceramic honeycomb body, the abutting portion having a substantially flat abutting end surface perpendicular to the main axis; and the ceramic honeycomb body being held by pressing the abutting surfaces of the first and second fixing jigs to both end surfaces of the ceramic honeycomb body, such that the center axis of the ceramic honeycomb body is substantially in alignment with the main axis of the lathe.

(a) Holding of Ceramic Honeycomb Body

Figure 2A:
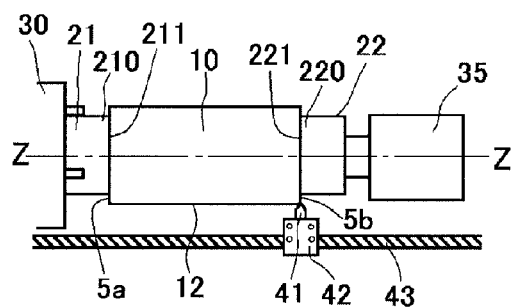
FIG. 2(a) is a schematic plan view showing the machining of a peripheral portion of a ceramic honeycomb body by a lathe according to an embodiment of the method of the present invention.
Figure 2B:
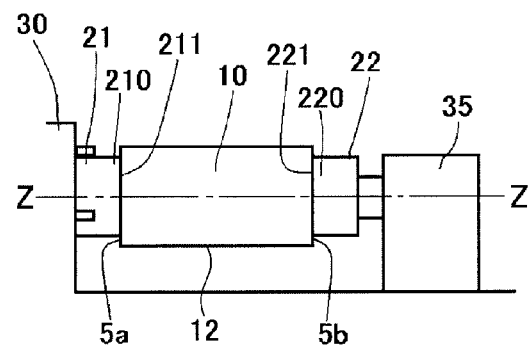
FIG. 2(b) is a schematic side view showing the machining of a peripheral portion of a ceramic honeycomb body by a lathe according to an embodiment of the method of the present invention.

FIGS. 2(a) and 2(b) show the removal of a peripheral portion 12 from the ceramic honeycomb body 10 by machining with a lathe 30 with a horizontal main axis Z. The ceramic honeycomb body 10 having large numbers of longitudinal cells partitioned by cell walls is rotatably held by fixing jigs 21, 22 on the main axis of the lathe 30. The lathe 30 comprises a first fixing jig 21 on the main axis Z, and a second fixing jig 22 attached to a tail stock 35 to substantially oppose the first fixing jig 21. Opposing end portions of the first fixing jig 21 and the second fixing jig 22 have abutting portions 210, 220 having smaller outer shapes than those of longitudinal end surfaces 5a, 5b of the ceramic honeycomb body 10; end surfaces of the abutting portions 210, 220 having substantially flat abutting surfaces 211, 221 perpendicular to the main axis Z.

The ceramic honeycomb body 10 is held by abutting both end surfaces 5a, 5b of the ceramic honeycomb body 10 to the end surfaces 211, 221 of the abutting portions 210, 220 of the first and second fixing jigs 21, 22, such that the center axis of the ceramic honeycomb body 10 is substantially in alignment with the main axis Z, and moving the second fixing jig 22 attached to the tail stock 35 toward the other fixing jig 21 to press both end surfaces 5a, 5b of the ceramic honeycomb body 10 with the abutting surfaces 211, 221 of the fixing jigs 21, 22.

The method of holding both end surfaces 5a, 5b of the ceramic honeycomb body 10 by pressing, which differs from a conventional method of fixing a ceramic honeycomb body 10 by directly gripping its end portion by a chuck, need not cut off an chucked, unmachined end portion of the ceramic honeycomb body 10 after machining, thereby providing a high yield in the production of the ceramic honeycomb body 10, with less breakage in the held portion of the ceramic honeycomb body 10 by a load during machining.

(b) Remove by Machining

The ceramic honeycomb body 10, whose both end surfaces 5a, 5b are held by pressing, are rotated around the main axis Z together with the fixing jigs 21, 22, and a tool 41 fixed to a carrier 42 is fed in parallel with the axis by a screw 43, to remove a peripheral portion 12 from the rotating ceramic honeycomb body 10 by machining.

In the machining of the peripheral portion 12 of the ceramic honeycomb body 10, the tool 41 can be fed along the entire length of the ceramic honeycomb body 10 from the first end surface 5a to the second end surface 5b to remove all the peripheral surface from the ceramic honeycomb body 10, because the abutting portions 210, 220 of the fixing jigs 21, 22 have smaller outer shapes than those of the end surfaces 5a, 5b of the ceramic honeycomb body 10.

Because the ceramic honeycomb body 10 has a highly brittle cell structure constituted by porous cell walls, a peripheral portion of the second end surface 5b may be broken when machining is completed (when the tool 41 reaches the second end surface 5b), in the removal of the peripheral portion 12 by feeding the tool 41 from the first end surface 5a toward the second end surface 5b. To avoid such breakage, the machining direction is preferably reversed en route, such that machining proceeds from both of the first and second end surfaces 5a, 5b of the ceramic honeycomb body 10, in the removal of the peripheral portion 12 from the ceramic honeycomb body 10 by machining.

Figure 10A:
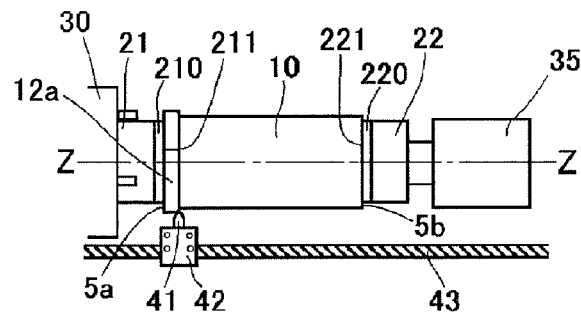
FIG. 10(a) is a schematic view showing the machining of a peripheral portion of a ceramic honeycomb body by a lathe according to a still further embodiment of the method of the present invention.
Figure 10B:
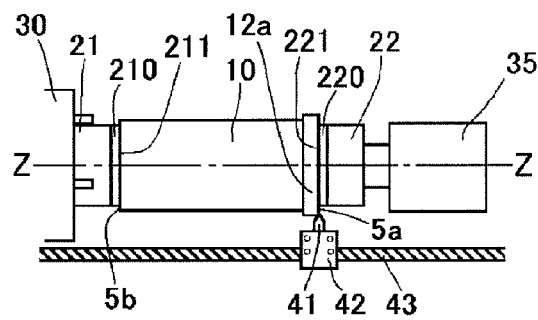
FIG. 10(b) is a schematic view showing the machining of a peripheral portion of a ceramic honeycomb body by a lathe according to a still further embodiment of the method of the present invention.

As shown in FIG. 10(a), the second end surface 5a and the first end surface 5b of the ceramic honeycomb body 10 are preferably rotatably held by pressing by the abutting surfaces 211, 221 of the first and second fixing jigs 21, 22, such that the center axis of the ceramic honeycomb body 10 is substantially in alignment with the main axis Z of the lathe 30;

the held ceramic honeycomb body 10 being rotated around the main axis Z as a center axis;

the tool 41 being fed along the rotating ceramic honeycomb body 10 from the first end surface 5b toward the second end surface 5a, to remove the peripheral portion 12 by machining up to a position of 1 mm or more from the second end surface 5a, with an unmachined peripheral portion 12a left on the side of the second end surface 5a, and the feeding of the tool 41 and the rotation of the ceramic honeycomb body 10 being stopped;

the first and second fixing jigs 21, 22 being detached from both end surfaces 5a, 5b of the ceramic honeycomb body 10 to release the ceramic honeycomb body 10 from the lathe 30;

in the ceramic honeycomb body 10 released from the lathe 30, as shown in FIG. 10(b), the first end surface 5b and the second end surface 5a being reversed, such that the first and second end surfaces 5b, 5a of the ceramic honeycomb body 10 abut the abutting surfaces 211, 221 of the first and second fixing jigs 21, 22, and both end surfaces 5a, 5b being rotatably held by pressing, such that the center axis of the ceramic honeycomb body 10 is substantially in alignment with the main axis Z of the lathe 30;

the ceramic honeycomb body 10 being rotated around the main axis Z; and the tool 14 being fed along the rotating ceramic honeycomb body 10 from the second end surface 5a toward the first end surface 5b, to remove the unmachined peripheral portion 12a by machining.

Figure 10C:
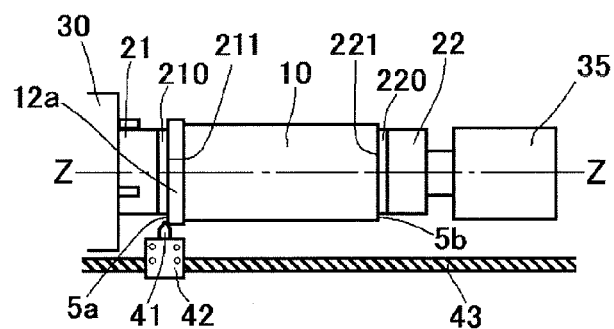
FIG. 10(c) is a schematic view showing the machining of a peripheral portion of a ceramic honeycomb body by a lathe according to a still further embodiment of the method of the present invention.

In another method, as shown in FIG. 10(a), the tool 41 is fed along the rotating ceramic honeycomb body 10 from the first end surface 5b toward the second end surface 5a, to remove the peripheral portion 12 by machining up to a position of 1 mm or more from the second end surface 5a, and the feeding of the tool 41 being stopped with an unmachined peripheral portion 12a left on the side of the second end surface 5a, the carrier 42 being moved in a direction perpendicular to the main axis Z, so that the tool 41 retreats from the ceramic honeycomb body 10; and the tool 41 being moved to the second end surface 5a of the ceramic honeycomb body 10 as shown in FIG. 10(c); and the tool 41 being fed along the rotating ceramic honeycomb body 10 from the second end surface 5a toward the first end surface 5b, to remove the unmachined peripheral portion 12a by machining.

Before the peripheral portion 12 is removed from the ceramic honeycomb body 10 by machining with the tool 14, the outer edges of the first and second end surfaces 5b, 5a of the ceramic honeycomb body 10 may be chamfered to further suppress the breakage of end surface edges when machining is completed.

In the present invention, a lathe used for the removal of the peripheral portion from the ceramic honeycomb body by machining need not be a so-called general lathe, but may have any structure as long as the ceramic honeycomb body can be attached to a rotating main spindle to remove a peripheral portion therefrom by machining with a tool. The main spindle may be directed horizontally, vertically or therebetween.

A usable tool is a grinding tool, a cutting tool, etc. The grinding tool may be a grinder of grinding alumina particles, grinding carbide silicon particles, grinding diamond particles, etc., and the cutting tool may be a bite of cemented carbide, ceramics, diamond, sintered diamond, sintered CBN, etc.

(c) Structure of Abutting Portion

Figure 5A:
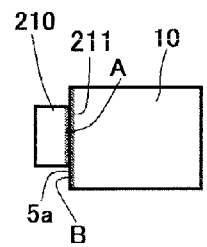
FIG. 5(a) is a schematic side view showing an example of abutting portions of lathes used in the method of the present invention.
Figure 5B:
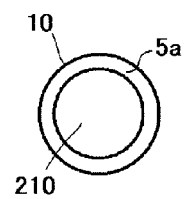
FIG. 5(b) is a schematic front view showing an example of abutting portions of lathes used in the method of the present invention.

The abutting portions 210, 220 have smaller outer shapes than those of the end surfaces 5a, 5b of the ceramic honeycomb body 10. This means that for example, when the abutting portion 210 (220) has a substantially circular transverse cross section as shown in FIGS. 5(a) and 5(b), the cross section of the abutting portion 210 (220) has a smaller diameter than that of the end surface 5a (5b) of the ceramic honeycomb body 10. Namely, a ratio (A/B) of the area A of the transverse cross section of the abutting portion 210 (220) to the area B of the end surface 5a (5b) of the ceramic honeycomb body 10 is less than 1. In this case, a transverse center of the cross section of the abutting portion 210 is preferably on the main axis of the lathe. The transverse cross section of the abutting portion 210 preferably has substantially the same outer shape as that of the abutting surface 211, 221.

Figure 5C:
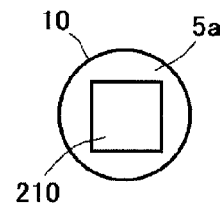
FIG. 5(c) is a schematic front view showing another example of abutting portions of lathes used in the method of the present invention.
Figure 5D:
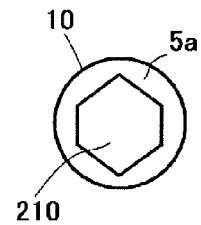
FIG. 5(d) is a schematic front view showing a further example of abutting portions of lathes used in the method of the present invention.

The transverse cross section of the abutting portion 210, 220 is not restricted to have a circular shape as shown in FIG. 5(b), but may have a rectangular shape as shown in FIG. 5(c), a hexagonal shape as shown in FIG. 5(d), or other shapes. When the transverse cross section of the abutting portion 210, 220 has a polygonal shape in place of a circular shape, that the abutting portion 210, 220 has a smaller outer shape than that of the end surface 5a, 5b of the ceramic honeycomb body 10 means that a minimum circle including the polygonal shape has a smaller diameter than that of the end surface 5a, 5b of the ceramic honeycomb body 10. Namely, a ratio (A/B) of the area A of the minimum circle including the polygonal shape to the area B of the end surface 5a, 5b of the ceramic honeycomb body 10 is less than 1. To surely hold the ceramic honeycomb body 10 with the fixing jigs 21, 22, the ratio A/B is preferably 0.3 or more, more preferably 0.5 or more.

Figure 4A:
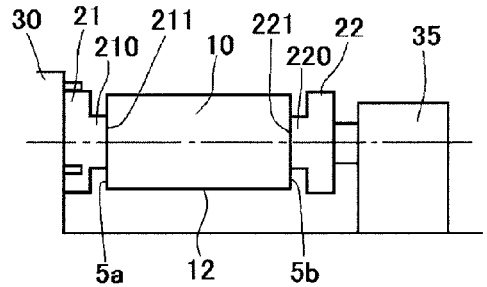
FIG. 4(a) is a schematic view showing the machining of a peripheral portion of a ceramic honeycomb body by a lathe according to a further embodiment of the method of the present invention.
Figure 4B:
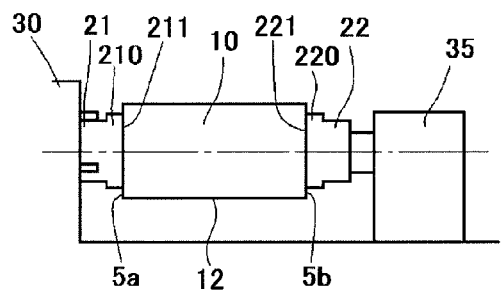
FIG. 4(b) is a schematic view showing the machining of a peripheral portion of a ceramic honeycomb body by a lathe according to a still further embodiment of the method of the present invention.

As long as the abutting portions 210, 220 have smaller outer shapes than those of the end surfaces 5a, 5b of the ceramic honeycomb body 10, other portions of the fixing jigs 21, 22 than the abutting portions 210, 220 need not have smaller outer shapes than those of the end surfaces 5a, 5b of the ceramic honeycomb body 10. For example, as shown in FIG. 4(a), other portions of the fixing jigs 21, 22 than the abutting portions 210, 220 may have larger outer shapes than those of the abutting portions 210, 220. Also, as shown in FIG. 4(b), other portions of the fixing jigs 21, 22 than the abutting portions 210, 220 may have smaller outer shapes than those of the abutting portions 210, 220.

Figure 3A:
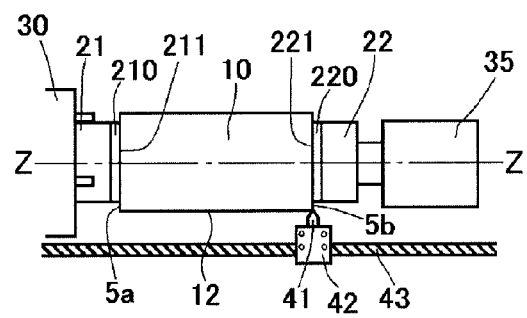
FIG. 3(a) is a schematic plan view showing the machining of a peripheral portion of a ceramic honeycomb body by a lathe according to another embodiment of the method of the present invention.
Figure 3B:
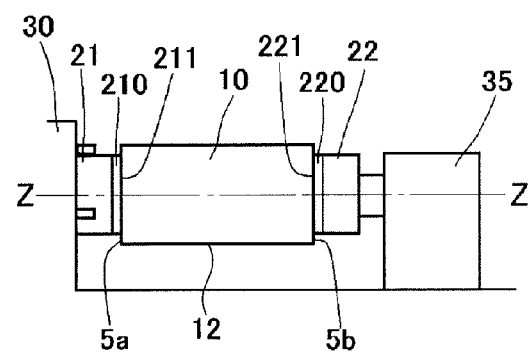
FIG. 3(b) is a schematic side view showing the machining of a peripheral portion of a ceramic honeycomb body by a lathe according to another embodiment of the method of the present invention.

The abutting portions 210, 220 may be detachable from the fixing jigs 21, 22. For example, as shown in FIGS. 3(a) and 3(b), the abutting portions 210, 220 having smaller outer shapes than those of the end surfaces 5a, 5b of the ceramic honeycomb body 10, which have substantially flat abutting surfaces 211, 221 brought into contact with the end surfaces 5a, 5b of the ceramic honeycomb body 10, may be detachably fixed to the fixing jigs 21, 22 with bolts, screws, nails, adhesives, etc. As such detachable members, the abutting portions 210, 220 may be made of different materials from those of the fixing jigs 21, 22, making it possible to effectively prevent breakage in the ceramic honeycomb body 10 pressed by both end surfaces 5a, 5b of the ceramic honeycomb body 10. To effectively prevent breakage in the pressed portions of the ceramic honeycomb body 10, the abutting portions 210, 220 are preferably made of nonmetallic materials such as resins, woods, etc., particularly resins.

Figure 6A:
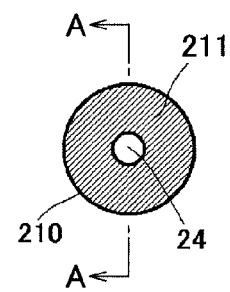
FIG. 6(a) is a schematic front view showing a still further example of abutting portions of lathes used in the method of the present invention.
Figure 6B:
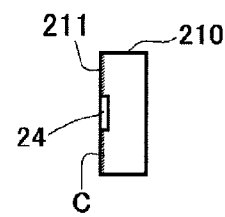
FIG. 6(b) is a cross-sectional view taken along the line A-A in FIG. 6(a).

In order that the fixing jigs 21, 22 surely hold both end surfaces 5a, 5b of the ceramic honeycomb body 10, a ratio of the area C of each abutting surface 211, 221 to the transverse cross section area A of each abutting portion 210, 220 is preferably 30-100%. As described above, because the transverse cross section of each abutting portion 210, 220 preferably has substantially the same outer shape as that of each abutting surface 211, 221, the area ratio C/A of 30-100% is achieved by having, for example, a recess 24 in the abutting surface 211 as shown in FIGS. 6(a) and 6(b). In this case, a hatched portion in FIG. 6(a) is the area C of the abutting surface 211. This area ratio C/A is preferably 50-100%, more preferably 70-100%.

To surely hold both end surfaces 5a, 5b of the ceramic honeycomb body 10, the abutting surfaces 211, 221 brought into contact with the end surfaces 5a, 5b of the ceramic honeycomb body 10 preferably have surface roughness (maximum height Rz) of 10-500 µm. When the surface roughness is less than 10 µm, the end surfaces 5a, 5b of the ceramic honeycomb body 10 is not sufficiently held, so that the ceramic honeycomb body 10 may be displaced by a machining load, breaking its held portions. On the other hand, when the surface roughness is more than 500 µm, a load is likely applied to both end surfaces 5a, 5b of the ceramic honeycomb body 10 when pressed, making the breakage of the end surfaces 5a, 5b likely. The surface roughness is preferably 50-400 µm, more preferably, 80-350 µm.

(d) Lathe Having Vertical Main Axis

Figure 7A:
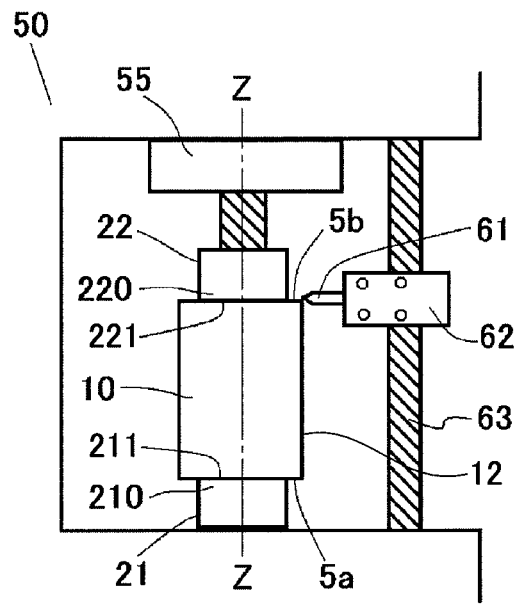
FIG. 7(a) is a schematic view showing an example of lathes with vertical main axes (Z-axes) for machining a peripheral portion of a ceramic honeycomb body by the method of the present invention.

When a large ceramic honeycomb body 10 of 150 mm or more in outer diameter and 150 mm or more in length is machined by the lathe 30, the ceramic honeycomb body 10 should be held with a larger force to withstand its own weight. However, when too high pressure is applied to both end surfaces 5a, 5b of the ceramic honeycomb body 10, the end surfaces 5a, 5b may be broken. Thus, for example, as shown in FIG. 7(a), a lathe 50 is provided with a substantially vertical main axis, and the ceramic honeycomb body 10 is disposed substantially vertically, so that a large ceramic honeycomb body 10 can be surely held under relatively low pressure. A machining method using such a lathe 50 with a substantially vertical main axis will be explained in detail below.

The lathe 50 with a substantially vertical main axis Z comprising a first fixing jig 21 disposed on the main axis Z, and a second fixing jig 22 mounted to an upper fixing member 55 and substantially opposing the first fixing jig 21. The first and second fixing jigs 21, 22 have abutting end portions 210, 220 opposing each other, the abutting end portions 210, 220 having smaller outer shapes than those of the end surfaces 5a, 5b of the ceramic honeycomb body 10, and the end surfaces of the abutting portions 210, 220 having substantially flat abutting end surfaces 211, 221 perpendicular to the main axis.

The ceramic honeycomb body 10 is held by bringing the abutting surfaces 211, 221 of the first and second fixing jigs 21, 22 into contact with both end surfaces 5a, 5b of the ceramic honeycomb body 10, such that the center axis of the ceramic honeycomb body 10 is substantially in alignment with the main axis Z of the lathe 50, and vertically moving the second fixing jig 22 mounted to the upper fixing member 55 to press both end surfaces 5a, 5b of the ceramic honeycomb body 10.

The ceramic honeycomb body 10 with both end surfaces 5a, 5b pressed for holding is rotated around the main axis Z together with the fixing jigs 21, 22, and a tool 61 fixed to a carrier 62 is fed by a screw 63 in parallel with the main axis Z while biting a peripheral portion 12 of the rotating ceramic honeycomb body 10, so that the peripheral portion 12 is removed by machining.

Thus, using a lathe 50 with a substantially vertical main axis Z, even a large ceramic honeycomb body 10 of 150 mm or more in outer diameter and 150 mm or more in length can be surely held by relatively low pressure applied to both end surfaces 5a, 5b thereof. Accordingly, even when a large load is applied during machining to remove the peripheral portion 12, the held portions of the ceramic honeycomb body 10 are not broken. Because the ceramic honeycomb body 10 can be surely held by relatively small pressure, the ceramic honeycomb body 10 is unlikely displaced by a machining load, thereby preventing the breakage of the peripheral surface during machining. Further, because the peripheral portion 12 can be removed from the entire length of the ceramic honeycomb body 10 from the first end surface 5a to the second end surface 5b by machining, a step of removing a chucked portion is not needed, resulting in a high yield in the production of the ceramic honeycomb body 10.

(e) Positioning Jig

Figure 8A:
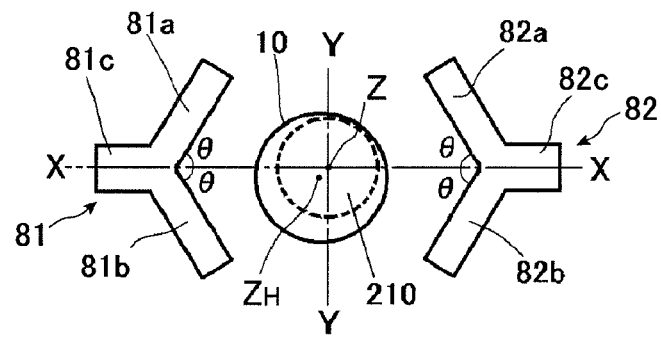
FIG. 8(a) is a schematic view showing a method for positioning a ceramic honeycomb body by positioning jigs, such that the center axis $Z_H$ of the ceramic honeycomb body is substantially in alignment with the main axis Z of the lathe.

After the end surface 5a of the ceramic honeycomb body 10 comes into contact with the abutting surface 211 of the abutting portion 210 of the first fixing jig 21, the center axis of the ceramic honeycomb body 10 is substantially aligned with the main axis of the lathe Z for the high-precision machining of the peripheral portion of the ceramic honeycomb body 10. Using positioning jigs 81, 82 disposed on an axis (X-axis in the figure) perpendicularly passing the main axis Z as shown in FIG. 8(a), the center axis of the ceramic honeycomb body 10 can be easily aligned with the main axis of the lathe Z. Each positioning jig 81 (82) comprises a rod member 81c (82c) extending in the X-axis direction, and two-pronged contact members 81a, 81b (82a, 82b) extending from a tip end of the rod member 81c (82c) and expanding with an angle θ from the X-axis. The two-pronged contact members 81a, 81b of the positioning jig 81 and the two-pronged contact members 82a, 82b of the positioning jig 82 are opposing, and movably disposed in the X-axis direction so that they can fix the ceramic honeycomb body 10, with the contact members 81a, 81b, 82a, 82b in contact with the peripheral surface of the ceramic honeycomb body 10 at four points.

Figure 8B:
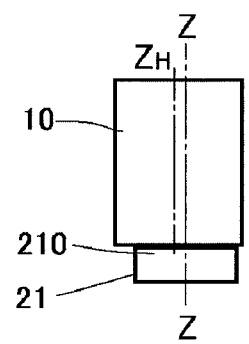
FIG. 8(b) is a schematic view showing a method for positioning a ceramic honeycomb body by positioning jigs, such that the center axis $Z_H$ of the ceramic honeycomb body is substantially in alignment with the main axis Z of the lathe.
Figure 8C:
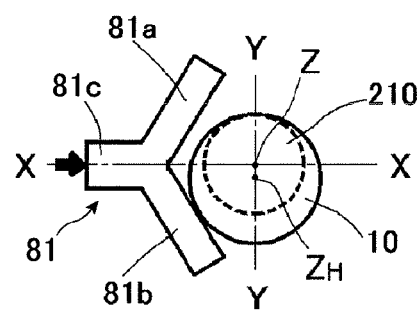
FIG. 8(c) is a schematic view showing a method for positioning a ceramic honeycomb body by a positioning jig, such that the center axis $Z_H$ of the ceramic honeycomb body is substantially in alignment with the main axis Z of the lathe.

To align the center axis $Z_H$ of the ceramic honeycomb body 10 with the main axis of the lathe Z, positions on the peripheral surface of the ceramic honeycomb body 10, at which the center axis $Z_H$ of the ceramic honeycomb body 10 is in alignment with the main axis Z, are calculated from its outer diameter, and the stop positions of the positioning jigs 81, 82 are determined such that the contact members 81a, 81b and the contact members 82a, 82b come into contact with the peripheral surface. When the ceramic honeycomb body 10 is placed with its center axis $Z_H$ not aligned with the main axis of the lathe Z as shown in FIGS. 8(a) and 8(b), one positioning jig 81 is first moved in the X-axis direction to the stop position determined in advance, which is near the ceramic honeycomb body 10 as shown in FIG. 8(c). In this case, the ceramic honeycomb body 10 may be moved together with the contact members 81a, 81b, depending on its initial position.

Figure 8D:
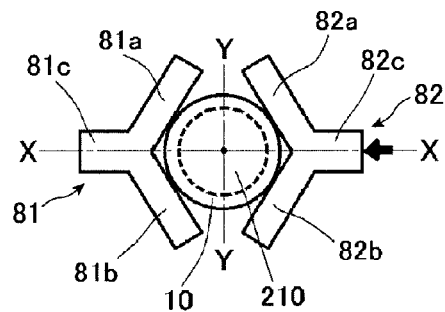
FIG. 8(d) is a schematic view showing a method for positioning a ceramic honeycomb body by positioning jigs, such that the center axis $Z_H$ of the ceramic honeycomb body is substantially in alignment with the main axis Z of the lathe.

As shown in FIG. 8(d), another positioning jig 82 is then moved in the X-axis direction to the stop position determined in advance, such that the ceramic honeycomb body 10 is moved by the contact members 82a, 82b. With any of the contact members 82a, 82b being in contact with the ceramic honeycomb body 10 during the movement of the positioning jig 82 in the X-axis direction, the ceramic honeycomb body 10 moves in both X-axis and Y-axis directions, so that displacement in both X-axis and Y-axis directions is eliminated. With the positioning jig 82 moved to the stop position determined in advance, the ceramic honeycomb body 10 is fixed by the contact members 81a, 81b and the contact members 82a, 82b at four points, so that the center axis $Z_H$ of the ceramic honeycomb body 10 is substantially in alignment with the main axis of the lathe Z.

(f) Machining Conditions for Removal

The removal of the peripheral portion 12 from the ceramic honeycomb body 10 by machining is preferably conducted by cutting the ceramic honeycomb body 10 rotating at a circumferential speed of 1-10 m/s, at a longitudinal feeding rate of 0.1-1 mm/rev. When the circumferential speed is less than 1 m/s, the peripheral portion 12 is not sufficiently removed by machining, leaving unmachined portions. On the other hand, when it exceeds 10 m/s, a large load is applied to the end surfaces 5a, 5b of the ceramic honeycomb body 10 during machining, making it likely to break the held portions of the ceramic honeycomb body 10. When the feeding rate is less than 0.1 mm/rev, too much time is needed for machining, resulting in low efficiency. On the other hand, when it exceeds 1 mm/rev, a large load is applied during machining, making it likely to break the held portions of the ceramic honeycomb body 10.

The method of the present invention for removing a peripheral portion by machining is applicable to both an unsintered ceramic honeycomb body and a sintered ceramic honeycomb body. Because the sintered ceramic honeycomb body more likely suffers breakage in held portions during machining the peripheral portion with a lathe, because it has lower strength by loosing a binder existing in the unsintered ceramic honeycomb body. Particularly in the case of a high-porosity honeycomb body, its tendency is remarkable. Accordingly, the method of the present invention is effective particularly when used on a sintered ceramic honeycomb body and a high-porosity honeycomb body.

(3) Other Steps

A peripheral surface of the ceramic honeycomb body with its peripheral portion removed by machining is coated with a coating material, dried, and if necessary, sintered to a ceramic honeycomb structure. The coating material may be a paste prepared by blending the ceramic material, colloidal silica or colloidal alumina, a binder, water, and if necessary, a dispersant, etc. The ceramic material may be the same as or different from used in the ceramic honeycomb body. For example, usable ceramic materials are cordierite, alumina, mullite, silica, aluminum titanate, etc. Also, the coating material may contain ceramic fibers and an inorganic or organic binder, in addition to the ceramic material.

In the ceramic honeycomb body with its peripheral portion removed by machining, one or the other end portions of flowing paths may be alternately plugged with a plugging material, sintered, and coated with a coating material on the peripheral surface to provide a ceramic honeycomb filter. The formation of plugs and sintering may be conducted before removing the peripheral portion by machining. The plugging material may be formed by a ceramic material, colloidal silica or colloidal alumina, a binder, water, and if necessary, a dispersant, etc. The ceramic material may be cordierite, alumina, mullite, silica, aluminum titanate, etc. The ceramic material may be the same as or different from that of the ceramic honeycomb body.

Figure 9A:
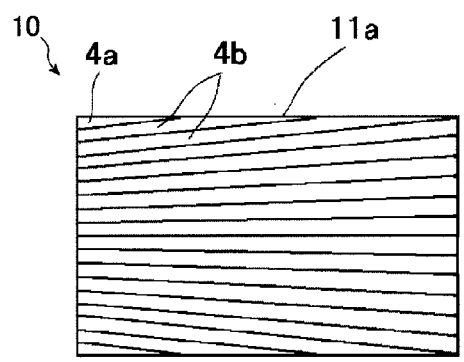
FIG. 9(a) is a longitudinal cross-sectional view schematically showing another example of ceramic honeycomb bodies.
Figure 9B:
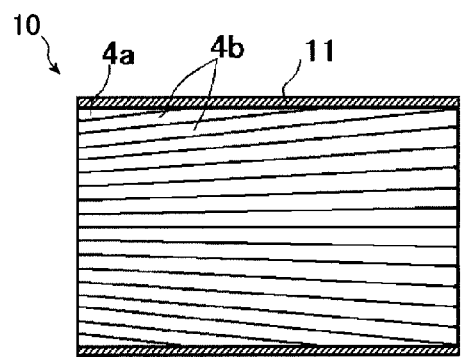
FIG. 9(b) is a longitudinal cross-sectional view schematically showing a further example of ceramic honeycomb bodies.

In a ceramic honeycomb body 10 with its peripheral portion removed by machining, end of outermost flowing paths 4a and flowing paths 4b inside the outermost flowing paths 4a in predetermined numbers are open on the peripheral surface 11a as shown in FIG. 9(a). Such peripheral surface 11a may be coated with a coating material to form a peripheral wall 11 as shown in FIG. 9(b). With such a structure, the ends of the outermost flowing paths 4a and the flowing paths 4b inside the outermost flowing paths 4a in predetermined numbers are closed by the peripheral wall 11, exhibiting a heat insulation effect. This shortens temperature elevation time from the start of operation, thereby activating a catalyst, if any, in a shorter period of time.

The present invention will be explained in more detail referring to Examples below, without intention of restricting the present invention thereto.

Example 1

(a) Production of Ceramic Honeycomb Body

Kaolin powder, talc powder, silica powder and alumina powder were mixed to form a cordierite-forming material powder comprising 50% by mass of $SiO_2$, 36% by mass of $Al_2O_3$ and 14% by mass of MgO, and this material powder was sufficiently dry-mixed with 8% by mass in total of methylcellulose and hydroxypropyl methylcellulose as a binder, a lubricant, and 7.0% by mass of foamed resin (average particle size: 40 μm) as a pore-forming material, and then fully blended with water to prepare a plasticized, moldable ceramic material. This moldable ceramic material was extruded, cut to a predetermined length to produce a honeycomb-structured green body having an outer diameter of 125 mm and a length of 150 mm, and dried for 20 minutes in a microwave-drying furnace to obtain a dried ceramic honeycomb body.

(b) Removal of Peripheral Portion by Machining

Using a lathe 30 (lathe A) shown in FIGS. 2(a) and 2(b), a peripheral portion 12 of the ceramic honeycomb body 10 was removed by machining by a method below. The lathe A comprised a first fixing jig 21 on its main axis Z, and a second fixing jig 22 mounted to a tail stock 35 such that it opposed the first fixing jig 21, opposing end portions of the first and second fixing jigs 21, 22 had abutting portions 210, 220 having substantially flat abutting surfaces 211, 221 perpendicular to the main axis Z. Each abutting portion 210, 220, which was made of steel, had a circular cross section of 90 mm in diameter [see FIGS. 5(a) and 5(b)], a percentage of the abutting surface 211, 221 to the abutting portion 210, 220 being 100%, and the abutting surface 211, 221 having surface roughness (maximum height Rz) of 200 μm.

The second end surface 5a and first end surface 5b of the ceramic honeycomb body 10 were in contact with the abutting surfaces 211, 221 of the abutting portions 210, 220, such that the center axis of the ceramic honeycomb body 10 were substantially in alignment with the main axis Z, and pressed by the second fixing jig 22 mounted to the tail stock 35 to pressure-hold both end surfaces 5a, 5b of the ceramic honeycomb body 10. This held ceramic honeycomb body 10 was rotated around the main axis Z at a circumferential speed of 5 m/s, so that a peripheral portion 12 was removed from the entire length of the ceramic honeycomb body 10 from the first end surface 5b to the second end surface 5a, by machining with a cemented carbide bite (tool 41) fixed to a carrier 42, at a cutting depth of 2 mm and a feeding rate of 0.5 mm/rev.

After the completion of machining, the ceramic honeycomb body 10 was taken out of the fixing jigs 21, 22, to evaluate the breakage of the held portions and peripheral surface of the ceramic honeycomb body 10, and a yield.

The ceramic honeycomb body 10 after evaluation was sintered by an 8-day schedule having the highest temperature of 1410° C. in a sintering furnace, and a peripheral surface of the sintered ceramic honeycomb body 10 was coated with a coating material comprising cordierite powder, a binder and water to a thickness of 1 mm, and dried to provide a ceramic honeycomb structure.

The breakage of the holding portions of the ceramic honeycomb body 10 was evaluated by the following standard, by observing the end surfaces 5a, 5b of the machined ceramic honeycomb body 10 by the naked eye. The results are shown in Table 1.

Excellent No breakage occurred.
Good Breakage of less than 0.5 mm occurred.
Fair Breakage of 0.5 mm or more and less than 1 mm occurred.
Poor Breakage of 1 mm or more occurred.

The breakage of the peripheral surface of the ceramic honeycomb body 10 was evaluated by the following standard, by observing the peripheral surface of the machined ceramic honeycomb body 10 by the naked eye. The results are shown in Table 1.

Excellent No breakage occurred.
Good Breakage of less than 0.5 mm occurred.
Fair Breakage of 0.5 mm or more and less than 1 mm occurred.
Poor Breakage of 1 mm or more occurred.

The yield was evaluated by a mass ratio of the machined ceramic honeycomb body 10 to the ceramic honeycomb body 10 before peripheral machining, by the following standard. The results are shown in Table 1.

Excellent Yield was 95% or more.
Good Yield was 90% or more and less than 95%.
Poor Yield was less than 90%.

Examples 2-7

A dried ceramic honeycomb body 10 was produced in the same manner as in Example 1, and a peripheral portion 12 was removed from the dried ceramic honeycomb body 10 by machining with a lathe 30 (lathe B) shown in FIGS. 3(a) and 3(b) in the same manner as in Example 1, except for changing the abutting portions 210, 220 and the machining conditions (circumferential speed and feed rate) as shown in Table 1. The lathe B used herein was the same as the lathe A used in Example 1, except that abutting portions 210, 220 as separate members were threadably attached to the fixing jigs 21, 22, so that abutting portions 210, 220 were exchangeable. After the completion of machining, the same evaluation as in Example 1 was conducted, and sintering and the application of a coating material to the peripheral surface were conducted in the same manner as in Example 1 to produce a ceramic honeycomb structure.

Examples 8-10

A dried ceramic honeycomb body 10 was produced in the same manner as in Example 1, and this dried body was sintered by an 8-day schedule having the highest temperature of 1410° C. in a sintering furnace, to obtain a sintered ceramic honeycomb body 10. A peripheral portion 12 of this sintered ceramic honeycomb body 10 was removed by machining in the same manner as in Examples 2-7, except for changing the abutting portions 210, 220 and the machining conditions (circumferential speed and feed rate) as shown in Table 1. The abutting member used in Example 9 had a rectangular cross section [see FIG. 5(c)], and the abutting member used in Example 10 had a hexagonal cross section [see FIG. 5(d)]. After the completion of machining, the same evaluation as in Example 1 was conducted, and sintering and the application of a coating material to the peripheral surface were conducted in the same manner as in Example 1, to produce a ceramic honeycomb structure.

Example 11

A sintered ceramic honeycomb body 10 was produced in the same manner as in Example 10, and as described in detail below, a peripheral portion 12 was removed from the sintered ceramic honeycomb body 10 by machining in the same manner as in Example 10, except for reversing the machining direction en route, such that machining proceeded from both of the first and second end surfaces 5a, 5b of the ceramic honeycomb body 10.

The ceramic honeycomb body 10 was first held in the same manner as in Example 1, and a cemented carbide bite (tool 41) was fed from the first end surface 5b toward the second end surface 5a as shown in FIG. 10(a), to remove a peripheral portion 12 under the machining conditions (circumferential speed and feed rate) shown in Table 1. After the peripheral portion 12 was removed by machining up to a position of 5 mm from the second end surface 5a, the feeding of the cemented carbide bite (tool 41) was stopped with an unmachined peripheral end portion 12a of 5 mm left on the side of the second end surface 5a. With the rotation of the ceramic honeycomb body 10 stopped, the first and second fixing jigs 21, 22 were released from both end surfaces 5a, 5b of the ceramic honeycomb body 10, to detach the ceramic honeycomb body 10 from the lathe 30. The first end surface 5b and the second end surface 5a were then reversed as shown in FIG. 10(b), namely, the first and second end surfaces 5b, 5a of the ceramic honeycomb body 10 were brought into contact with the abutting surface 211 of the first fixing jig 21 and the abutting surface 221 of the second fixing jig 22, both end surfaces 5a, 5b of the ceramic honeycomb body 10 were rotatably held by pressing, such that the center axis of the ceramic honeycomb body 10 was substantially in alignment with the main axis Z of the lathe 30. The cemented carbide bite (tool 41) was fed along the ceramic honeycomb body 10 rotating around the main axis Z from the second end surface 5a toward the first end surface 5b, to remove the unmachined peripheral portion 12a by machining under the same conditions as described above.

After the completion of machining, the same evaluation as in Example 1 was conducted, and sintering and the application of a coating material to the peripheral surface were conducted in the same manner as in Example 1, to produce a ceramic honeycomb structure.

Example 12

A sintered ceramic honeycomb body 10 was produced in the same manner as in Example 10, and a peripheral portion 12 was removed from the sintered ceramic honeycomb body 10 by machining in the same manner as in Example 11, except for reversing the feeding direction of a cemented carbide bite (tool 41) en route as described in detail below, instead of reversing the direction of the ceramic honeycomb body 10 en route, such that machining proceeded from both of the first and second end surfaces 5a, 5b of the ceramic honeycomb body 10.

As in Example 11, a cemented carbide bite (tool 41) was fed from the first end surface 5b toward the second end surface 5a as shown in FIG. 10(a), under the machining conditions (circumferential speed and feed rate) shown in Table 1, to remove a peripheral portion 12 by machining. After the peripheral portion 12 was removed by machining up to a position of 5 mm from the second end surface 5a, the feeding of the cemented carbide bite (tool 41) was stopped, with an unmachined peripheral end portion 12a of 5 mm left on the side of the second end surface 5a. The tool 41 was then retreated from the ceramic honeycomb body 10 by moving the carrier 42 in a perpendicular direction to the main axis Z, and the tool 41 was moved to the second end surface 5a of the ceramic honeycomb body 10 as shown in FIG. 10(c). The cemented carbide bite (tool 41) was then fed along the rotating ceramic honeycomb body 10 from the second end surface 5a toward the first end surface 5b, to remove the unmachined peripheral portion 12a by machining under the same conditions as described above.

After the completion of machining, the same evaluation as in Example 1 was conducted, and sintering and the application of a coating material to the peripheral surface were conducted in the same manner as in Example 1, to produce a ceramic honeycomb structure.

Example 13

A dried ceramic honeycomb body 10 was obtained in the same manner as in Example 1, except for changing the size of an extrudate having a honeycomb structure to an outer diameter of 270 mm and a length of 300 mm. A peripheral portion 12 was removed from the ceramic honeycomb body 10 by machining by a method below using a lathe 50 (lathe C) having a vertical main axis as shown in FIG. 7(a).

A lathe 50 (lathe C) having a substantially vertical main axis Z comprises a first fixing jig 21 on the main axis Z, and a second fixing jig 22 mounted to an upper fixing member 55 and substantially opposing the first fixing jig 21. The first and second fixing jigs 21, 22 comprise abutting end portions 210, 220 opposing each other, which have smaller outer shapes than those of the end surfaces 5a, 5b of the ceramic honeycomb body 10, the end surfaces of the abutting portions 210, 220 have substantially flat abutting surfaces perpendicular to the main axis 211, 221. Each abutting portion 210, 220 has a circular transverse cross section of 200 mm in diameter, and is made of steel. A ratio of the abutting surface 211, 221 to the abutting portion 210, 220 was 100%, and the abutting surface 211, 221 had surface roughness (maximum height Rz) of 200 μm.

The abutting surfaces 211, 221 of the abutting portions 210, 220 were brought into contact with the second and first end surfaces 5a, 5b of the ceramic honeycomb body 10, such that the center axis of the ceramic honeycomb body 10 was substantially in alignment with the main axis Z of the lathe 50 (lathe C), and the second fixing jig 22 mounted to the upper fixing member 55 was vertically moved to press both end surfaces 5a, 5b of the ceramic honeycomb body 10. This ceramic honeycomb body 10 thus held was rotated around the main axis Z at a circumferential speed of 5 m/s, and the peripheral portion 12 was removed from the entire length of the ceramic honeycomb body 10 from the first end surface 5b to the second end surface 5a by machining with a cemented carbide bite (tool 61) fixed to a carrier 62 at a cutting depth of 2 mm and a feeding rate of 0.5 mm/rev.

The positioning of the dried ceramic honeycomb body 10 on the lathe was conducted as described below, using positioning jigs 81, 82 shown in FIG. 8(a). Positions on the peripheral surface of the ceramic honeycomb body 10, at which its center axis $Z_H$ was in alignment with the main axis Z, were first calculated from the outer diameter (270 mm) of the ceramic honeycomb body 10, and the stop positions of the positioning jigs 81, 82 were determined such that the contact members 81a, 81b and the contact members 82a, 82b were located at the calculated positions on the peripheral surface. The ceramic honeycomb body 10 was placed in a state where the center axis ZH was not in alignment with the main axis of the lathe Z as shown in FIGS. 8(a) and 8(b), and one positioning jig 81 was moved in the X-axis direction to a stop position determined in advance near the ceramic honeycomb body 10, as shown in FIG. 8(*c*).

As shown in FIG. 8(*d*), another positioning jig 82 was then moved in the X-axis direction, so that the ceramic honeycomb body 10 was moved by the contact members 82*a*, 82*b*. With any of the contact members 82*a*, 82*b* coming into contact with the ceramic honeycomb body 10 while moving the positioning jig 82 in the X-axis direction, the ceramic honeycomb body 10 moves in both X-axis and Y-axis directions, so that displacement in the X-axis and Y-axis directions was eliminated. With the positioning jig 82 moved to the stop position determined in advance, the ceramic honeycomb body 10 was fixed by the contact members 81*a*, 81*b* and contact members 82*a*, 82*b* at four points, such that the center axis $Z_H$ of the ceramic honeycomb body 10 was substantially in alignment with the main axis of the lathe Z.

After the completion of machining, the same evaluation as in Example 1 was conducted, and sintering and the application of a coating material to the peripheral surface were conducted in the same manner as in Example 1, to produce a ceramic honeycomb structure.

Examples 14-19

Figure 7B:
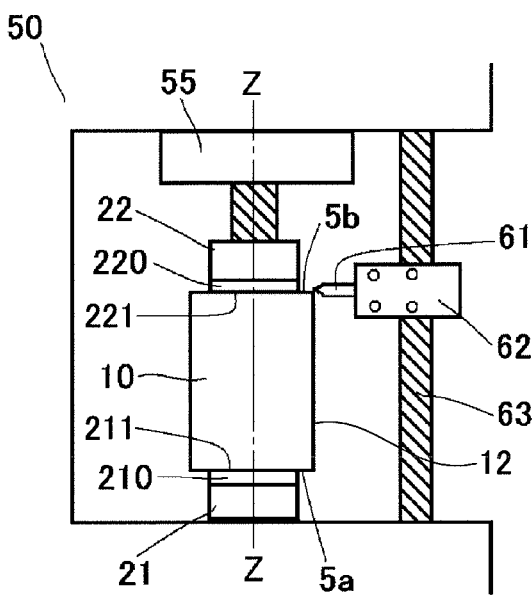
FIG. 7(b) is a schematic view showing another example of lathes with vertical main axes (Z-axes) for machining a peripheral portion of a ceramic honeycomb body by the method of the present invention.

Using a lathe 50 (lathe D) having a vertical main axis as shown in FIG. 7(*b*), a peripheral portion 12 was removed by machining from a dried ceramic honeycomb body 10 produced in the same manner as in Example 13, except for changing the abutting portions 210, 220 and the machining conditions (circumferential speed and feed rate) as shown in Table 1. A lathe D used here was the same as the lathe C used in Example 13, except for comprising abutting portions 210, 220 as separate members, which were detachably attached to the fixing jigs 21, 22 by bolts. After the completion of machining, the same evaluation as in Example 1 was conducted, and sintering and the application of a coating material to the peripheral surface were conducted in the same manner as in Example 1, to produce a ceramic honeycomb structure.

Examples 20-22

A dried ceramic honeycomb body 10 was produced in the same manner as in Example 13, and this dried body was sintered by 8-day schedule having the highest temperature of 1410° C. in a sintering furnace, to obtain a sintered ceramic honeycomb body 10. A peripheral portion 12 of this sintered ceramic honeycomb body 10 was removed by machining in the same manner as in Examples 14-19, except for changing the abutting portions 210, 220 and the machining conditions (circumferential speed and feed rate) as shown in Table 1. The abutting member used in Example 21 had a rectangular cross section [see FIG. 5(*c*)], and the abutting member used in Example 22 had a hexagonal cross section [see FIG. 5(*d*)]. After the completion of machining, the same evaluation as in Example 1 was conducted, and sintering and the application of a coating material to the peripheral surface were conducted in the same manner as in Example 1, to produce a ceramic honeycomb structure.

Example 23

A sintered ceramic honeycomb body 10 was produced in the same manner as in Example 22, and a peripheral portion 12 was removed from the ceramic honeycomb body 10 by machining in the same manner as in Example 22, except for reversing the machining direction en route as described in detail below, such that machining proceeded from both of the first and second end surfaces 5*a*, 5*b* of the ceramic honeycomb body 10.

Figure 11A:
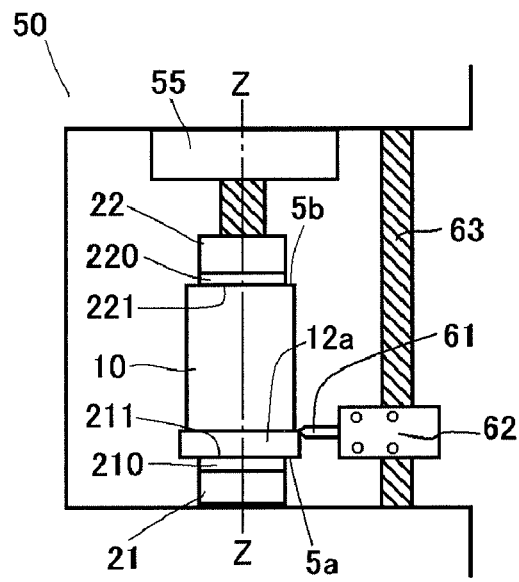
FIG. 11(a) is a schematic view showing the machining of a peripheral portion of a ceramic honeycomb body by a lathe according to a still further embodiment of the method of the present invention.
Figure 11B:
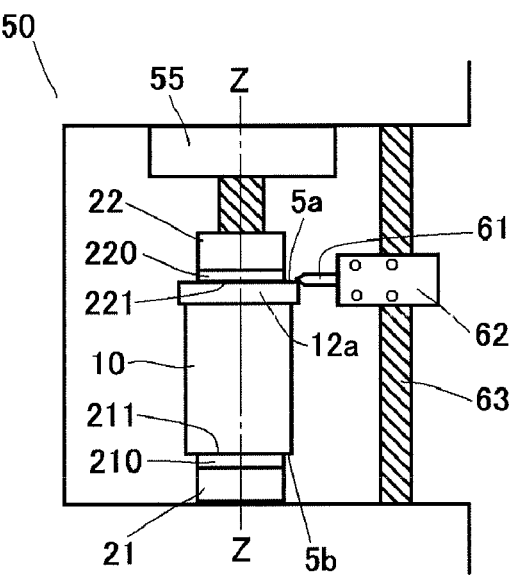
FIG. 11(b) is a schematic view showing the machining of a peripheral portion of a ceramic honeycomb body by a lathe according to a still further embodiment of the method of the present invention.
Figure 11C:
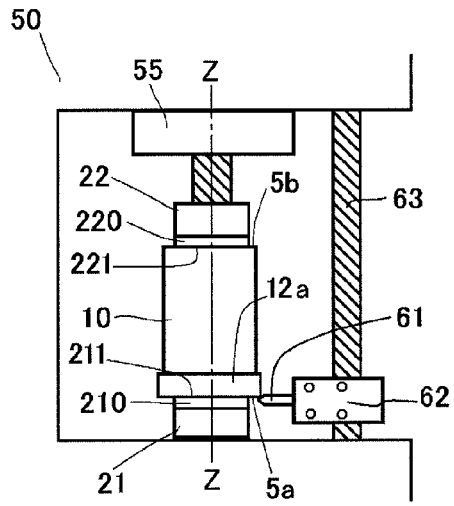
FIG. 11(c) is a schematic view showing the machining of a peripheral portion of a ceramic honeycomb body by a lathe according to a still further embodiment of the method of the present invention.

With the ceramic honeycomb body 10 held in the same manner as in Example 13, a cemented carbide bite (tool 61) was fed from the first end surface 5*b* toward the second end surface 5*a* as shown in FIG. 11(*a*), to remove a peripheral portion 12 by machining under the machining conditions (circumferential speed and feed rate) shown in Table 1. After the peripheral portion 12 was removed by machining up to a position of 5 mm from the second end surface 5*a*, the feeding of the cemented carbide bite (tool 61) and the rotation of the ceramic honeycomb body 10 were stopped, with an unmachined end peripheral portion 12*a* left on the side of the second end surface 5*a*. The first and second fixing jigs 21, 22 were released from both end surfaces 5*a*, 5*b* of the ceramic honeycomb body 10, to take the ceramic honeycomb body 10 out of the lathe 30. As shown in FIG. 11(*b*), the first end surface 5*b* and the second end surface 5*a* were then reversed, namely, the first end surface 5*b* and second end surface 5*a* of the ceramic honeycomb body 10 were brought into contact with the abutting surface 211 of the first fixing jig 21 and the abutting surface 221 of the second fixing jig 22, such that the center axis of the ceramic honeycomb body 10 was substantially in alignment with the main axis Z of the lathe 30. With both end surfaces 5*a*, 5*b* rotatably held by pressing, the ceramic honeycomb body 10 was rotated around the main axis Z, and the cemented carbide bite (tool 61) was fed from the second end surface 5*a* toward the first end surface 5*b*, to remove the unmachined peripheral portion 12*a* by machining under the same conditions as described above.

After the completion of machining, the same evaluation as in Example 1 was conducted, and sintering and the application of a coating material to the peripheral surface were conducted in the same manner as in Example 1, to produce a ceramic honeycomb structure.

Example 24

A sintered ceramic honeycomb body 10 was produced in the same manner as in Example 22, and a peripheral portion 12 was removed from the sintered ceramic honeycomb body 10 by machining in the same manner as in Example 23, except that the feeding direction of the cemented carbide bite (tool 41) was reversed en route as described in detail below, instead of reversing the direction of the ceramic honeycomb body 10 en route, such that machining proceeded from both of the first and second end surfaces 5*a*, 5*b* of the ceramic honeycomb body 10.

In the same manner as in Example 23, a cemented carbide bite (tool 61) was fed from the first end surface 5*b* toward the second end surface 5*a* as shown in FIG. 11(*a*), to remove a peripheral portion 12 by machining under the machining conditions (circumferential speed and feed rate) shown in Table 1. After the peripheral portion 12 was removed by machining up to a position of 5 mm from the second end surface 5*a*, the feeding of the cemented carbide bite (tool 61) was stopped with an unmachined peripheral end portion 12*a* of 5 mm left on the side of the second end surface 5*a*. The tool 61 was then retreated from the ceramic honeycomb body 10 by moving the carrier 62 in a perpendicular direction to the main axis Z. The cemented carbide bite (tool 61) was fed from the second end surface 5*a* toward the first end surface 5*b* as shown in FIG. 11(*c*), to remove an unmachined peripheral portion 12a from the rotating ceramic honeycomb body 10 by machining under the same conditions as described above.

After the completion of machining, the same evaluation as in Example 1 was conducted, and sintering and the application of a coating material to the peripheral surface were conducted in the same manner as in Example 1, to produce a ceramic honeycomb structure.

Comparative Example 1

A dried ceramic honeycomb body 10 was produced in the same manner as in Example 1 except for changing its length to 170 mm, resulting in the dried ceramic honeycomb body 10 having an outer diameter of 125 mm and a length of 170 mm.

Figure 12A:
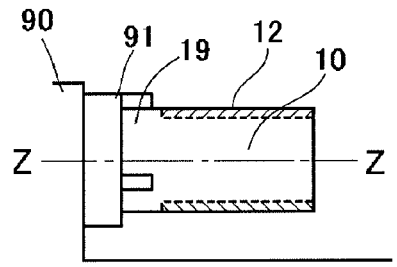
FIG. 12(a) is a schematic view showing a conventional method for machining a peripheral portion of a ceramic honeycomb body by a lathe.
Figure 12B:
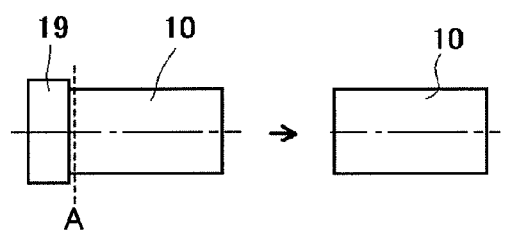
FIG. 12(b) is a schematic view showing a conventional method for machining a peripheral portion of a ceramic honeycomb body by a lathe.

Using a lathe shown in 90 (lathe E) shown in FIG. 12(a), a peripheral portion 12 was removed from the dried ceramic honeycomb body 10 by machining. One end portion of the ceramic honeycomb body 10 was held by a scroll chuck 91 on the main axis Z of the lathe E, to fix the ceramic honeycomb body 10 to the lathe E. The ceramic honeycomb body 10 was rotated around the main axis Z at a circumferential speed of 5 m/s, and a cemented carbide bite (not shown) fixed to a carrier was fed to remove the peripheral portion 12 from the ceramic honeycomb body 10 by machining at a cutting depth of 2 mm and a feeding rate of 0.5 mm/rev.

After the peripheral portion 12 was removed by machining, an end portion held by the chuck 91 was cut at a position A of 20 mm from the end surface, to provide a ceramic honeycomb body 10 of 125 mm in outer diameter and 150 mm in length. After the completion of machining, the same evaluation as in Example 1 was conducted.

Comparative Example 2

A dried ceramic honeycomb body 10 produced in the same manner as in Comparative Example 1 was sintered by an 8-day schedule having the highest temperature of 1410° C. in a sintering furnace, to obtain a sintered ceramic honeycomb body 10 having an outer diameter of 125 mm and a length of 170 mm.

Using a lathe E shown in FIG. 12(a), a peripheral portion 12 was removed from the sintered ceramic honeycomb body 10 by machining in the same manner as in Comparative Example 1.

After the peripheral portion 12 was removed by machining, an end portion held by the chuck 91 was cut at a position A of 20 mm from the end surface, to obtain a ceramic honeycomb body 10 of 125 mm in outer diameter and 150 mm in length. After the completion of machining, the same evaluation as in Example 1 was conducted.

Comparative Example 3

A dried ceramic honeycomb body 10 produced in the same manner as in Example 1 was sintered by an 8-day schedule having the highest temperature of 1410° C. in a sintering furnace, to obtain a sintered ceramic honeycomb body 10. Using a lathe A, a peripheral portion 12 was removed from the ceramic honeycomb body 10 by machining in the same manner as in Example 1, except for changing the abutting portions 210, 220 to circular members having a diameter of 150 mm. After the completion of machining, the same evaluation as in Example 1 was conducted.

TABLE 1

| | | Honeycomb Body | | Abutting Member | |
| --- | --- | --- | --- | --- | --- |
| No. | Type of Lathe | To Be Machined | Outer Shape of End Surface (mm) | Outer Shape[(1)] | Maximum Diameter[(2)] |
| Example 1 | Lathe A | Dried Body | 125 | Circular | 90 |
| Example 2 | Lathe B | Dried Body | 125 | Circular | 90 |
| Example 3 | Lathe B | Dried Body | 125 | Circular | 90 |
| Example 4 | Lathe B | Dried Body | 125 | Circular | 90 |
| Example 5 | Lathe B | Dried Body | 125 | Circular | 90 |
| Example 6 | Lathe B | Dried Body | 125 | Circular | 90 |
| Example 7 | Lathe B | Dried Body | 125 | Circular | 90 |
| Example 8 | Lathe B | Sintered Body | 125 | Circular | 90 |
| Example 9 | Lathe B | Sintered Body | 125 | Rectangular | 90 |
| Example 10 | Lathe B | Sintered Body | 125 | Hexagonal | 90 |
| Example 11 | Lathe B | Sintered Body | 125 | Hexagonal | 90 |
| Example 12 | Lathe B | Sintered Body | 125 | Hexagonal | 90 |
| Example 13 | Lathe C | Dried Body | 270 | Circular | 200 |
| Example 14 | Lathe D | Dried Body | 270 | Circular | 200 |
| Example 15 | Lathe D | Dried Body | 270 | Circular | 200 |
| Example 16 | Lathe D | Dried Body | 270 | Circular | 200 |
| Example 17 | Lathe D | Dried Body | 270 | Circular | 200 |
| Example 18 | Lathe D | Dried Body | 270 | Circular | 200 |
| Example 19 | Lathe D | Dried Body | 270 | Circular | 200 |
| Example 20 | Lathe D | Sintered Body | 270 | Circular | 200 |
| Example 21 | Lathe D | Sintered Body | 270 | Rectangular | 200 |
| Example 22 | Lathe D | Sintered Body | 270 | Hexagonal | 200 |
| Example 23 | Lathe D | Sintered Body | 270 | Hexagonal | 200 |
| Example 24 | Lathe D | Sintered Body | 270 | Hexagonal | 200 |

TABLE 1-continued

| | | | | | |
|---|---|---|---|---|---|
| Com. Ex. 1 | Lathe E | Dried Body | 125 | — | — |
| Com. Ex. 2 | Lathe E | Sintered Body | 125 | — | — |
| Com. Ex. 3 | Lathe A | Sintered Body | 125 | Circular | 150 |

| | Abutting Member | | Machining Conditions | |
|---|---|---|---|---|
| No. | Material | Area Ratio of Abutting Surface (%)[3] | Roughness of Abutting Surface Rz (μm) | Circumferential Speed (m/s) | Feeding Rate (mm/rev) |
| Example 1 | Steel | 100 | 200 | 5 | 0.5 |
| Example 2 | Resin | 70 | 200 | 5 | 0.5 |
| Example 3 | Resin | 30 | 200 | 5 | 0.5 |
| Example 4 | Resin | 15 | 200 | 5 | 0.5 |
| Example 5 | Resin | 70 | 5 | 5 | 0.5 |
| Example 6 | Resin | 70 | 200 | 1 | 0.1 |
| Example 7 | Resin | 70 | 200 | 10 | 1.0 |
| Example 8 | Resin | 70 | 200 | 5 | 0.5 |
| Example 9 | Resin | 50 | 200 | 8 | 0.8 |
| Example 10 | Resin | 50 | 200 | 8 | 0.8 |
| Example 11 | Resin | 50 | 200 | 8 | 0.8 |
| Example 12 | Resin | 50 | 200 | 8 | 0.8 |
| Example 13 | Steel | 100 | 200 | 5 | 0.5 |
| Example 14 | Resin | 70 | 200 | 5 | 0.5 |
| Example 15 | Resin | 30 | 200 | 5 | 0.5 |
| Example 16 | Resin | 15 | 200 | 5 | 0.5 |
| Example 17 | Resin | 70 | 5 | 5 | 0.5 |
| Example 18 | Resin | 70 | 200 | 1 | 0.1 |
| Example 19 | Resin | 70 | 200 | 10 | 1.0 |
| Example 20 | Resin | 70 | 200 | 5 | 0.5 |
| Example 21 | Resin | 50 | 200 | 8 | 0.8 |
| Example 22 | Resin | 50 | 200 | 8 | 0.8 |
| Example 23 | Resin | 50 | 200 | 8 | 0.8 |
| Example 24 | Resin | 50 | 200 | 8 | 0.8 |
| Com. Ex. 1 | Resin | — | — | 5 | 0.5 |
| Com. Ex. 2 | Resin | — | — | 5 | 0.5 |
| Com. Ex. 3 | Steel | 100 | 200 | 5 | 0.5 |

| | Evaluation Results | | |
|---|---|---|---|
| No. | Breakage of Held Portions | Breakage of Peripheral Surface | Yield |
| Example 1 | Good | Excellent | Good |
| Example 2 | Excellent | Excellent | Good |
| Example 3 | Good | Excellent | Good |
| Example 4 | Fair | Excellent | Good |
| Example 5 | Fair | Excellent | Good |
| Example 6 | Excellent | Good | Good |
| Example 7 | Fair | Excellent | Good |
| Example 8 | Excellent | Excellent | Good |
| Example 9 | Good | Excellent | Good |
| Example 10 | Good | Excellent | Good |
| Example 11 | Excellent | Excellent | Good |
| Example 12 | Excellent | Excellent | Good |
| Example 13 | Good | Excellent | Excellent |
| Example 14 | Excellent | Excellent | Excellent |
| Example 15 | Good | Excellent | Excellent |
| Example 16 | Fair | Excellent | Excellent |
| Example 17 | Fair | Excellent | Excellent |
| Example 18 | Excellent | Good | Excellent |
| Example 19 | Fair | Excellent | Excellent |
| Example 20 | Excellent | Excellent | Excellent |
| Example 21 | Good | Excellent | Excellent |
| Example 22 | Good | Excellent | Excellent |
| Example 23 | Excellent | Excellent | Excellent |
| Example 24 | Excellent | Excellent | Excellent |
| Com. Ex. 1 | Fair | Excellent | Poor |
| Com. Ex. 2 | Poor | Excellent | Poor |
| Com. Ex. 3 | Excellent | Excellent | Poor |

Note:
[1] The outer shape of a transverse cross section of the abutting member.
[2] A diameter of the minimum circle including the outer shape of the cross section.
[3] A ratio (C/A) of the area C of the abutting surface to the area A of the transverse cross section of the abutting portion.

As is clear from Table 1, because both end surfaces of the ceramic honeycomb body of Examples 1-24 within the present invention were held by pressing with the fixing jigs instead of holding one end portion of the ceramic honeycomb body by a chuck, a dispersed load was applied by machining for the removal of a peripheral portion, resulting in less breakage in the held portions of the ceramic honeycomb body, and a high yield. On the other hand, because an end portion of the ceramic honeycomb body was held by a chuck in Comparative Examples 1 and 2, breakage occurred in the held portion of the ceramic honeycomb body, with an extremely low yield. Because the abutting surface of the abutting member had a larger outer shape than that of the ceramic honeycomb body in Comparative Example 3, a peripheral portion near an end portion of the ceramic honeycomb body could not be removed by machining, so that an unmachined portion had to be cut off, resulting in a low yield.

EFFECTS OF THE INVENTION

When a peripheral portion is removed from a ceramic honeycomb body by machining with a lathe, less breakage occurs in held portions in the method of the present invention. Accordingly, the method of the present invention can provide a high-quality ceramic honeycomb body with a high yield, with a suppressed production cost.

What is claimed is:

1. A method for producing a ceramic honeycomb body having large numbers of longitudinal cells partitioned by cell walls, with its peripheral portion removed by machining, comprising
   rotatably holding said ceramic honeycomb body on a main axis of a lathe, and rotating said ceramic honeycomb body around said main axis, to remove a peripheral portion of said ceramic honeycomb body by machining with a cutting tool;
   said lathe comprising a first fixing jig and second fixing jig on said main axis, said second fixing jig substantially opposing said first fixing jig;
   each of said first and second fixing jigs having an abutting portion opposing each other, said abutting portion having a smaller outer shape than that of the end surface of the ceramic honeycomb body, and said abutting portion having a substantially flat abutting surface perpendicular to the main axis; and
   said ceramic honeycomb body being held by pressing said abutting surfaces of said first and second fixing jigs to both end surfaces of said ceramic honeycomb body, such that the center axis of said ceramic honeycomb body is substantially in alignment with the main axis of the lathe; and
   wherein said abutting portions are detachable from said fixing jigs and made of resin;
   wherein said abutting surface has surface roughness (maximum height Rz) of 10-500 μm; and
   wherein an area ratio of said abutting surface to a cross section of said abutting portion perpendicular to said main axis is 30-100%.

2. The method for producing a ceramic honeycomb body according to claim 1, wherein the main axis of said lathe is substantially vertical.

3. The method for producing a ceramic honeycomb body according to claim 1, wherein the removal by machining is conducted by longitudinally cutting the ceramic honeycomb body, which is rotating at a circumferential speed of 1-10 m/s, with a feeding rate of 0.1-1 mm/rev.

4. The method for producing a ceramic honeycomb body according to claim 1, wherein said ceramic honeycomb body is a sintered body.

5. The method for producing a ceramic honeycomb body according to claim 1, wherein a peripheral surface of the ceramic honeycomb body, from which said peripheral portion is removed by machining, is coated with a coating material to form a ceramic honeycomb structure.

6. The method for producing a ceramic honeycomb body according to claim 1, wherein the removal of said peripheral portion by machining is conducted by
   feeding said tool along said rotating ceramic honeycomb body from the first end surface toward the second end surface, to remove said peripheral portion by machining up to a position of 1 mm or more from the second end surface, stopping the feeding of said tool with an unmachined peripheral portion left on the side of the second end surface, and stopping the rotation of said ceramic honeycomb body;
   releasing said ceramic honeycomb body from said lathe;
   reversing the first and second end surfaces of said ceramic honeycomb body, rotatably holding said ceramic honeycomb body on the main axis of the lathe, such that its center axis is substantially in alignment with the main axis of the lathe, and rotating said ceramic honeycomb body around said main axis;
   and
   feeding said tool along the rotating ceramic honeycomb body from the second end surface toward the first end surface, to remove said unmachined peripheral portion by machining.

7. The method for producing a ceramic honeycomb body according to claim 1, wherein the removal of said peripheral portion by machining is conducted by
   feeding said tool along said rotating ceramic honeycomb body from the first end surface toward the second end surface, to remove said peripheral portion by machining up to a position of 1 mm or more from the second end surface, stopping the feeding of said tool with an unmachined peripheral portion left on the side of the second end surface, and causing said tool to retreat from said ceramic honeycomb body; and
   feeding said tool along said rotating ceramic honeycomb body from the second end surface toward the first end surface, to remove said unmachined peripheral portion by machining.

8. The method for producing a ceramic honeycomb body according to claim 1, wherein before the peripheral portion is removed from said ceramic honeycomb body by machining with a tool, the first and second end surfaces of said ceramic honeycomb body are chamfered.

9. The method for producing a ceramic honeycomb body according to claim 1, wherein said abutting surface has recess.

10. The method for producing a ceramic honeycomb body according to claim 1, wherein the area ratio of said abutting surface to a cross section of said abutting portion perpendicular to said main axis is 50-100%.

11. The method for producing a ceramic honeycomb body according to claim 10, wherein said abutting surface has a recess.

12. The method for producing a ceramic honeycomb body according to claim 1, wherein the area ratio of said abutting surface to a cross section of said abutting portion perpendicular to said main axis is 70-100%.

13. The method for producing a ceramic honeycomb body according to claim 12, wherein said abutting surface has a recess.

14. The method for producing a ceramic honeycomb body according to claim 1, wherein said abutting surface has surface roughness (maximum height Rz) of 50-400 μm.

15. The method for producing a ceramic honeycomb body according to claim 1, wherein said abutting surface has surface roughness (maximum height Rz) of 80-350 μm.

16. The method for producing a ceramic honeycomb body according to claim 1, wherein said abutting surface has surface roughness (maximum height Rz) of 50-400 μm.

17. The method for producing a ceramic honeycomb body according to claim 1, wherein said abutting surface has surface roughness (maximum height Rz) of 80-350 μm.

* * * * *